United States Patent
Janeczek

(10) Patent No.: US 12,073,201 B1
(45) Date of Patent: Aug. 27, 2024

(54) INFERENCE PROCESSING OPERATOR OPTIMIZATION

(71) Applicant: Amazon Technologies, Inc., Seattle, WA (US)

(72) Inventor: Craig David Janeczek, Worcester, MA (US)

(73) Assignee: Amazon Technologies, Inc., Seattle, WA (US)

( * ) Notice: Subject to any disclaimer, the term of this patent is extended or adjusted under 35 U.S.C. 154(b) by 157 days.

(21) Appl. No.: 17/954,594

(22) Filed: Sep. 28, 2022

(51) Int. Cl.
*G06F 8/41* (2018.01)
*G06N 5/04* (2023.01)

(52) U.S. Cl.
CPC ............ *G06F 8/447* (2013.01); *G06F 8/4441* (2013.01); *G06N 5/04* (2013.01)

(58) Field of Classification Search
CPC .......... G06F 8/447; G06F 8/4441; G06N 5/04
See application file for complete search history.

(56) References Cited

U.S. PATENT DOCUMENTS

| | | | |
|---|---|---|---|
| 2003/0074649 A1* | 4/2003 | Poulsen | G06F 8/51 717/114 |
| 2022/0147808 A1* | 5/2022 | Ming Chang | G06F 7/5443 |

FOREIGN PATENT DOCUMENTS

CN 114936631 A * 8/2022

OTHER PUBLICATIONS

Matthias Boehm et al.; On Optimizing Operator Fusion Plans for Large-Scale Machine Learning in SystemML; Arxiv; 14 pages; retrieved on Jan. 12, 2024 (Year: 2018).*
Hugh Leather et al.; Automatic Feature Generation for Machine Learning-Based Optimising Compilation; ACM; 32 pages; retrieved on Jan. 12, 2024 (Year: 2014).*
Translated CN 114936631 A (Year: 2022).*

* cited by examiner

*Primary Examiner* — S. Sough
*Assistant Examiner* — Cuong V Luu
(74) *Attorney, Agent, or Firm* — K&L Gates LLP

(57) ABSTRACT

Devices and techniques are generally described for machine learning hardware optimization. In some examples, a first computing device may receive first data describing a first machine learning model. A first operator type and a first input size for a first layer of the first machine learning model may be determined from the first data. First executable code may be generated that defines a first operator for the first layer of the first machine learning model. The first operator may be specific to the first input size and the first operator type. The first executable code may be stored in non-transitory computer-readable memory. In some examples, second data may be input into the first machine learning model. The first machine learning model may process the second data to generate first output data based at least in part on execution of the first code.

20 Claims, 12 Drawing Sheets

EXAMPLE 1

./build/example1
result = 10

FIG. 3A

EXAMPLE 2

./build/example2
Compiled: 0x48 0xf 0xbf 0xd7 0x48 0xf 0xbf 0xc6 0x48 0xf 0xaf 0xc2 0xc3 0x0
0x0 0x0
result = 10

FIG. 3B

EXAMPLE 3

./build/example3
Enter dotproduct len (1-24): 16
Compiled: 0x48 0xf 0xbf 0x17 0x48 0xf 0xbf 0x6 0x48 0xf 0xaf 0xc2 0x48 0xf 0xbf 0x57 0x2 0x48 0xf 0xbf 0x4e 0x2 0x48 0xf 0xaf 0xca 0x48 0xf 0x1 0xc8 0x48 0xf 0xbf
result = 128826479, generalResult = 128826479
AVG Cycles custom = 42.927502, general = 52.497200

| Array Size | General Cycles | Custom Cycles | Improvement |
|---|---|---|---|
| 1 | 41.9958 | 41.9972 | 0.00% |
| 8 | 46.6491 | 42.5147 | 8.86% |
| 16 | 52.4981 | 44.7902 | 14.68% |
| 24 | 71.8262 | 55.1558 | 23.21% |

FIG. 3C

EXAMPLE 4

Enter dotproduct len (1-24): 16
Required 268 bytes of mem
Compiled: 0x48 0xf 0xbf 0x17 0x48 0xf 0xbf 0x6 0x48 0xf 0xaf 0xc2 0x48 0xf 0xbf 0x57 0x2 0x48 0xf 0xbf 0x4e 0x2 0x48 0xf 0xaf 0xca 0x8 0x1 0xc8 0x48 0xf 0xbf
result = 128826479, generalResult = 128826479

FIG. 3D

EXAMPLE 5

./build/example5
----DotProduct----
result = 128826479, generalResult = 128826479
----VectorAdd----
Result :2541 6363 5479 8175 2352 2008 5344 7791 4718 8253 9035 2627 2719 8068 8431 3194
General Result :2541 6363 5479 8175 2352 2008 5344 7791 4718 8253 9035 2627 2719 8068 8431 3194
----VectorMult----
Result : -25160 -5356 10632 28206 -31305 1360 26087 2746 -24360 20506 -23842 -12308 -30662 8019 -19452 -7944
General Result: -25160 -5356 10632 28206 -31305 1360 26087 2746 -24360 20506 -23842 -12308 -30662 8019 -19452 -7944

FIG. 3E

EXAMPLE 6

Model Schema Definition
{
  "length": integer – length of all vectors in this model, in this example every operator is of the same length
  "input": [integer] – array of "length" int16_t values, input data to the model
  "layers": [
    {
      "operation": str – valid options ['add', 'mult', 'dotProd'], selects the operation for the layer.
        all input and intermediate layers must either be 'add' or 'mult'
        last layer must be dotProd
      "data": [integer] – array of "length" int16_t values, data vector for this operation, can be seen
        like model layer weights
    },
  ],
}

FIG. 3F

EXAMPLE 6

./build/example6
Enter model file: model.json
Enable Dynamic Optimization (0,1): 1
output = 287090
Init Cycles 70128
Run Cycles 1968

./build/example6
Enter model file: model.json
Enable Dynamic Optimization (0,1): 0
output = 287090
Init Cycles 357
Run Cycles 3192

Average Results over 10 runs

| General Run Cycles | Dynamic Optimization Run Cycles | Improvement |
|---|---|---|
| 3716.1 | 2820.1 | 24.11% |

FIG. 3G

INFERENCE PROCESSING OPERATOR OPTIMIZATION

BACKGROUND

Machine learning techniques are used to form predictions, solve problems, recognize objects in image data for classification, etc. For example, machine learning techniques may be used to detect objects represented in image data and/or translate text from one human understandable language to another. In various examples, machine learning models may be improved over time by retraining the models as more or different data becomes available. Accordingly, machine learning techniques are adaptive to changing conditions. Deep learning algorithms, such as neural networks, are sometimes used to detect patterns in data and/or perform tasks.

BRIEF DESCRIPTION OF DRAWINGS

FIGS. 3A-3G depict examples of dynamic optimization of model operators at runtime for a given machine learning model, in accordance with various examples of the present disclosure.

DETAILED DESCRIPTION

Figure 1:
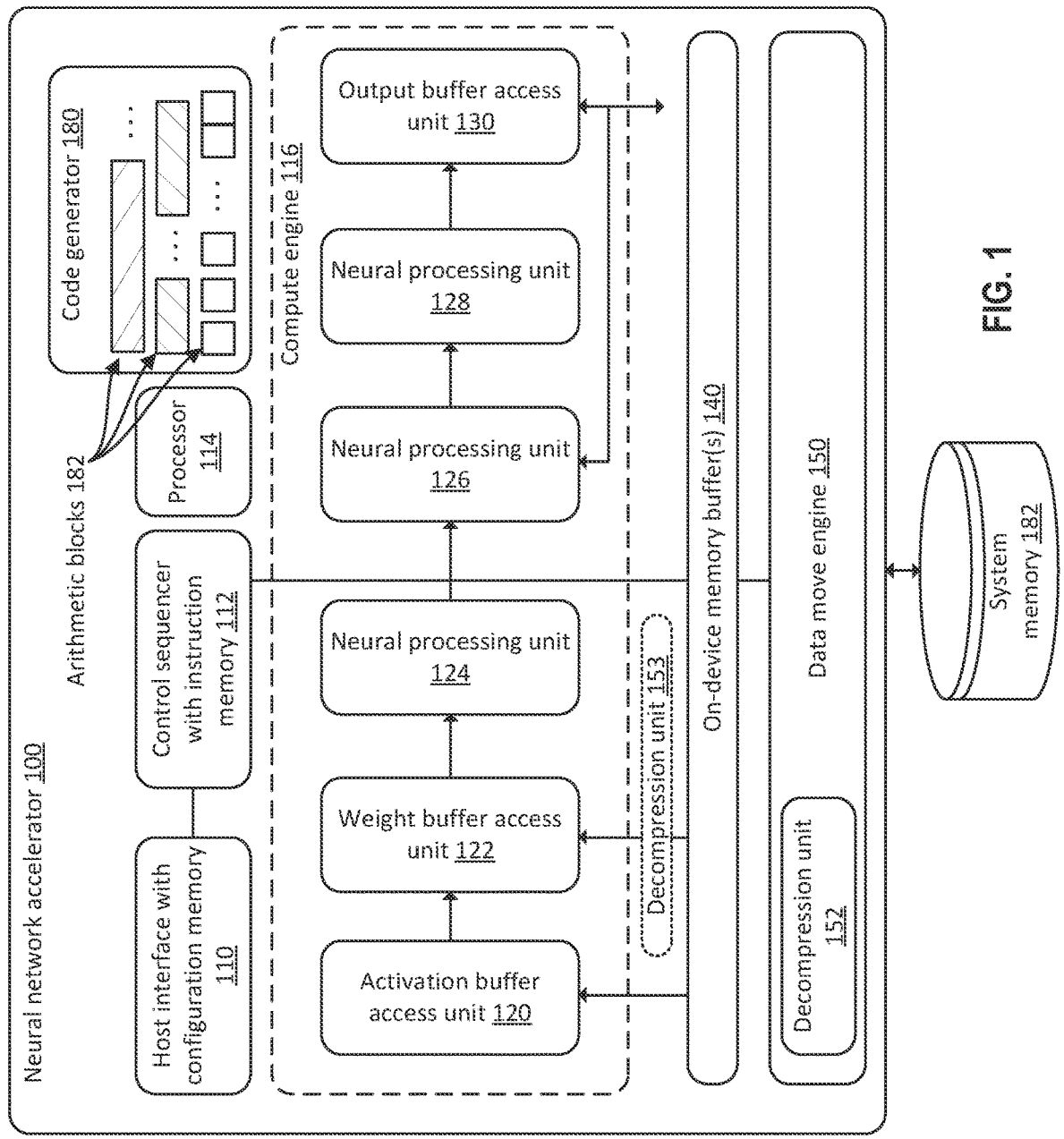
FIG. 1 is a block diagram of an example machine learning accelerator architecture comprising a code generator for operator optimization, according to various embodiments of the present disclosure.

In the following description, reference is made to the accompanying drawings that illustrate several examples of the present invention. It is understood that other examples may be utilized and various operational changes may be made without departing from the spirit and scope of the present disclosure. The following detailed description is not to be taken in a limiting sense, and the scope of the embodiments of the present invention is defined only by the claims of the issued patent.

Neural networks and other machine learning models are currently being developed for a wide variety of use cases, such as image and speech recognition. Such machine learning models can be executed on general purpose processors using program code written in a specialized programming language such as TensorFlow. The program code is converted into machine instructions by a compiler. In a neural network, the types of computations performed, and the data the computations are performed on, can be different from that used for other things. For example, neural networks can involve repeated manipulation of large quantities of data in the form of activation values and weight values. Weight values (and bias values) are examples of the learnable parameters of machine learning models. As used herein, weight values include both model weights and bias values. Activation values represent the weighted sum of the inputs for a given node of the machine learning model (which may be modified by bias terms and/or using an activation function). Because the amount of data is relatively large, supplying this data to a computing system that executes a neural network requires that the computing system have a correspondingly sized memory in which the data can be stored, as well as sufficient bandwidth to transmit the data between components of the computing system or between the computing system and external devices. This causes a relative demand in terms of the hardware requirements and power consumption of the computing system.

In various examples discussed herein, improvements to machine learning accelerator hardware is described. In some cases, machine learning accelerators (and/or general processors, depending on the implementation) may be programmed to implement an inference engine. An inference engine refers to programming a machine learning accelerator and/or general purpose processor (or processors) to execute the various operations of a particular machine learning model. Examples of such operations may include determining dot products of two vectors, vector addition, vector multiplication, matrix multiplication, forward and backward convolutions, pooling, etc. Inference engines may be implemented using machine learning accelerator hardware and/or other specialized processors (e.g., graphical processing units, tensor processing units). However, the optimized inference processing operators described herein need not be executed by any particular type of processor. The techniques described herein are applicable on both specialized processors (such as the machine learning accelerator hardware depicted in FIG. 1) as well as on general purpose processors.

In general, machine learning accelerators include a class of specialized hardware accelerators designed to accelerate machine learning applications by focusing on arithmetic operations and in-memory computing capability. A neural network accelerator (NNA) architecture is an example of a machine learning accelerator hardware that has been designed to accelerate processing for neural networks. A variety of different operations may be performed by a particular machine learning model during inference. For example, in a feed forward neural network, each hidden layer may include a specific number of neurons. For each neuron, the weighted sum of the neurons in the preceding layer may define that neuron's activation value, for a given input. Accordingly, the arithmetic operations for the hidden layer may include multiplication (e.g., multiplying the relevant weight value by the activation value of the connected neuron from the preceding layer) and/or addition (adding together all of the weighted values from the connected neurons from the preceding layer as well as adding a bias term). Some operators for machine learning models may be granular (e.g., addition) while other operations may be more complex and may involve several granular operations (e.g., 2D convolutions, matrix multiplication, etc.).

On-device inference engines are typically written with unoptimized versions of operators (e.g., arithmetic operators used to perform granular and/or complex operations such as those described above) in order to validate the functionality of the inference engine. Once basic functionality is confirmed, the operator implementations for the inference engine are replaced with operators that are optimized for any machine learning model which may be loaded (or may be expected to be loaded onto the device). In general, the result is that the operators of the inference engine are generic enough to handle a wide variety of input sizes and/or operator types. Thus, the operators of an unoptimized inference engine can be agnostic to the operatory type and/or input size. This general nature of inference engine operators is used to enable functionality for all supported models. However, once a model is loaded into device memory, the input sizes and operator types are known for every operation that occurs during inference. Manually optimizing the operators for each unique input size and/or operator type would result in quicker code execution, but can be technically difficult to scale, or maintain long term.

Described herein are various systems and techniques for, among other things, dynamic inference operator optimization for a specific model to be executed. In general, such optimization replaces the manually optimized general sized arithmetic operators with a series of size specific operators for the particular model that has been sent to the device. Instead of manually implementing fully-optimized operators, highly-optimized blocks of arithmetic operators are generated and stored in device memory. When a model is sent to the device and is initialized, metadata describing the model is parsed to determine the input/output sizes (e.g., in terms of the number of bits or dimensions) for each layer as well as the operator type for each layer (e.g., vector addition, matrix multiplication, scalar addition, etc.). The highly-optimized blocks of arithmetic operators may be retrieved from memory and combined to form the full operator. The building blocks may be stored in memory at varying levels of granularity. In various examples, additional processor cycles may be consumed during model initialization in order to create the optimized operators. However, during runtime, the optimized operators may conserve processor cycles and reduce latency and power consumption without loss of accuracy or precision. In addition to retrieving pre-compiled assembly code from memory, bytecode may be dynamically generated and compiled during initialization runtime to generate an optimized inference operator that is specific to the machine learning model at issue.

The dynamic inference operator optimization on device may begin when a particular machine learning model is first loaded at inference engine initialization time. A code generator executing on the device may use model metadata (e.g., schema data included with the model) to parse the model, by iterating through each layer, and may determine the arithmetic operators and corresponding input/output sizes for each layer of the model. For each operator found, the code generator decomposes the operator into one or more of the building blocks (e.g., of assembly code) stored in memory. The code generator then uses the building blocks as template data and generates an operator specific to the input/output size needed by the specific layer of the model. This process will result in the automatic generation of a runtime inference pipeline that is highly optimized to the particular model being run.

Machine learning techniques, such as those described herein, can be used to form predictions, solve problems, recognize objects in image data for classification, etc. In various examples, machine learning models may perform better than rule-based systems and may be more adaptable as machine learning models may be improved over time by retraining the models as more and more data becomes available. Accordingly, machine learning techniques are can adapt to changing conditions. Deep learning algorithms, such as neural networks, can be used to detect patterns in data and/or perform tasks.

Generally, in machine learned models, such as neural networks, parameters control activations in neurons (or nodes) within layers of the machine learned models. The weighted sum of activations of each neuron in a preceding layer may be input to an activation function (e.g., a sigmoid function, a rectified linear units (ReLu) function, etc.). The result determines the activation of a neuron in a subsequent layer. In addition, a bias value can be used to shift the output of the activation function to the left or right on the x-axis and thus may bias a neuron toward activation.

Generally, in machine learning models, such as neural networks, after initialization, annotated training data may be used to generate a cost or "loss" function that describes the difference between expected output of the machine learning model and actual output. The parameters (e.g., weights and/or biases) of the machine learning model may be updated to minimize (or maximize) the cost. For example, the machine learning model may use a gradient descent (or ascent) algorithm to incrementally adjust the weights to cause the most rapid decrease (or increase) to the output of the loss function. The method of updating the parameters of the machine learning model is sometimes referred to herein as back propagation.

FIG. 1 is a simplified block diagram of an NNA 100 according to various aspects of the present disclosure. The NNA 100 comprises a host interface 110, a control sequencer 112, an optional processor 114, an activation buffer access unit 120, a weight buffer access unit 122, a plurality of neural processing units (NPUs) 124, 126, and 128, an output buffer access unit 130, a set of on-device memory buffers 140, and a data move engine (DME) 150. The activation buffer access unit 120, the weight buffer access unit 122, the NPUs 124, 126, and 128, and the output buffer access unit 130 collectively form a compute engine 116. Along with the control sequencer 112 and the DME 150, the compute engine 116 is responsible for executing instructions. Although a neural network accelerator (NNA 100) is shown and described in the examples of FIG. 1, the inference processing operator optimization techniques described herein may be used with any machine learning hardware accelerator and/or with a general purpose processor.

The NNA 100 can be implemented as a standalone computing system or, as shown in FIG. 1, as part of a computing system comprising a host processor and system memory 182. The NNA 100 depicted in FIG. 1 is merely an example and is not intended to unduly limit the scope of claimed embodiments. One of ordinary skill in the art would recognize many possible variations, alternatives, and modifications. For example, in some implementations, NNA 100 may have more or fewer components than those shown in FIG. 1, may combine two or more components, or may have a different configuration or arrangement of components. The NNA 100 generally executes one set of instructions at a time. This set of instructions is referred to herein as a "context." At runtime, the NNA 100 sequences and dispatches, using control sequencer 112, instructions from a pre-compiled context for execution. In certain embodiments, each context comprises a set of instructions that ends with a HALT instruction. Contexts are created by a software compiler. The instructions within a context can implement at least part of a neural network. For example, a context can correspond to a complete layer, a partial layer, or multiple layers of the neural network. In some instances, a context can correspond to a complete neural network (e.g., with instructions for an input layer, a hidden layer, and an output layer).

The host interface 110 is a communication interface to the host processor (not depicted) of the computing system. The computing system includes system memory for storing data operated on by the NNA (e.g., weights, activations, and output values corresponding to inferences). The NNA 100 may be communicatively coupled to multiple hosts simultaneously, with any one of the hosts being able to program the NNA 100 to execute neural network-related tasks on behalf of the host. The host interface 110 can communicate with the host processor via a standard communication protocol such as, for example, Advanced extensible Interface (AXI) protocol. Similarly, the NNA 100 can include a separate communication interface for communicating with the system memory, e.g., to read and write data from the on-device memory buffers 140 to the system memory 182. The communication interface to the system memory 182 is, in certain embodiments, integrated into the DME 150. Thus, the DME 150 can also include an AXI interface.

The control sequencer 112 is responsible for sequencing, dispatching, and finishing execution of instructions. Some instructions are executed entirely in the control sequencer 112. Other instructions may be dispatched to one or more of the NPUs 124, 126, and 128 for execution, possibly with execution results being returned to the control sequencer 112 for further processing. Still other instructions are executed by the DME 150 to move data to and from the on-device memory buffers 140. More than one instruction can be in the execution phase at any given time within the NNA 100. The control sequencer 112 can include an instruction memory into which instructions to be executed by the NNA 100 are downloaded from the host processor or loaded from the system memory. In the example of FIG. 1, the host interface 110 includes a configuration memory. The configuration memory may include one or more registers that are configurable by the host processor to specify parameters relating to the context to be executed, e.g., various context dependent parameter registers (CDPRs).

In certain embodiments, the configuration memory includes a predicate register for synchronizing execution of instructions. Instructions are broadcast by the control sequencer 112 to each component of the compute engine 116 as well as the on-device memory buffers 140 and the DME 150. Upon receipt of a broadcast instruction, a component may proceed to execute at least part of the instruction in response to determining that the component is capable of handling the instruction. For example, the DME 150 could receive and execute a data move instruction, but the NPUs 124, 126, and 128 could ignore the data move instruction. Because instructions can execute concurrently in different components, it is useful to have a synchronization mechanism to handle any dependencies between instructions. The predicate register can be used to implement such a synchronization mechanism and, in certain embodiments, is a global register visible to internal components of the NNA 100, as well as visible to external entities such as the host processor. Synchronization also helps to prevent conflicts in accessing the on-device memory buffers 140.

The processor 114 is an optional general purpose processor for performing certain types of processing in parallel with processing performed by the NPUs 124, 126, and 128. For example, processor 114 may include a floating point unit or other arithmetic logic unit for performing general arithmetic operations in parallel with matrix operations performed by the NPUs 124, 126, and 128.

Upon loading a particular machine learning model from system memory 182, the code generator 180 may parse the model metadata (e.g., a graph structure of the model) to identify the particular input/output sizes of each layer of the model and may identify the different operator types at each layer. For example, the code generator 180 may determine that a particular model has an input layer that accepts a 10-dimensional vector as input, followed by a fully-connected layer with 20 neurons. Each neuron in the fully-connected layer may perform an operations that include multiplies the input value $x_i$ (from the 10-dimensional input) by a weight $w_i$ and determining the sum of the multiplied values. In other words, the summation is equal to the dot product of the 10-dimensional input vector x and the weight vector w. In various examples, a bias value may be added to the dot product as a separator operator for the layer (e.g., z=x·w+b and the result z may be passed through an activation function (another operator) such as the sigmoid function (e.g., $$y = \sigma(z) = \frac{1}{1+e^{-z}})$$

to generate the output y (which in this case has 20 dimensions since there are 20 neurons in the fully-connected layer). As can be seen from the example, there are several granular arithmetic operations in such a layer.

The code generator 180 determines the various operators at each layer of the loaded machine learning model and decomposes the operators into one or more arithmetic blocks 182 that have been previously coded. These arithmetic blocks 182 may include assembly instructions (assembly code) that can be implemented by the various neural processing units 124, 126, 128, etc. (or by processor 114) as part of the inference engine. The arithmetic blocks 182 may be coded at various levels of granularity. For example, low level assembly instructions such as shift right, add, etc., may be included. However, complex instructions that comprise multiple low level assembly instructions may also be used (e.g., an assembly building block that performs matrix multiplication). The arithmetic blocks 182 may accept parameter values (e.g., input size and expected output size) as shown in the following examples to enable the code generator 180 to optimize the selected arithmetic blocks 182 for the particular machine learning model that is being initialized.

The activation buffer access unit 120 is configured to access one or more activation buffers in the on-device memory buffers 140. Similarly, the weight buffer access unit 122 and the output buffer access unit 130 are configured to access one or more weight buffers and one or more output buffers, respectively. The activations stored in the activation buffer(s) correspond to activations produced by one or more layers of a neural network being executed on the NNA 100. The weights stored in the weight buffer(s) are synaptic weights associated with edges between a node of one layer and a node of another layer. Activation and weights are used for certain computations, including for instructions executed by the compute engine 116. The output buffers can store final results or intermediate results (e.g., partial sums) for access by the host processor or the system memory 182. The NPUs 124, 126, and 128 perform numerical operations using the activations and weights stored in the on-device memory buffers 140. Each NPU is configured to perform all or part of a compute instruction. Although FIG. 1 depicts the NPUs 124, 126, and 128 as block components, the NPUs 124, 126, and 128 are not necessarily identical. For example, the operations of one NPU may differ from the operations performed by another NPU.

The DME 150 is used to bidirectionally move instructions and data between the system memory and NNA on-device memories (e.g., the activation, the weight, and output buffers that form the on-device memory buffers 140). The DME 150 can receive data move instructions (e.g., LOAD and STORE instructions) from the control sequencer 112 when such instructions are broadcast. The data move instructions executed by DME 150 can execute concurrently with compute instructions executed by the control sequencer 112 or the compute engine 116.

As shown in FIG. 1, the DME 150 includes a decompression unit 152 that may be used to decompress weight data received from system memory 182 and optionally compressed using quantization aware training techniques. Quantization aware training may compress weight values (and/or other stored data of a model) into smaller representations. In various examples, the weights from system memory 182 may be decompressed into a format (e.g., 8-bit integer ("INT8")) that is compatible with the neural network accelerator 100. In various examples, the location of the decompression unit 152 can vary. For example, in another embodiment, the decompression unit 152 (e.g., "in-line" decompression) can be part of the compute engine 116 and is configured to decompress data stored in the on-device memory buffers 140 for input of the decompressed data to one or more of the NPUs 124, 126, and 128. Optionally, on-the-fly decompression may be used (e.g., by optional decompression unit 153) to decompress weight values in on-device memory buffer(s) 140 when loading weight values into weight buffer access unit 122.

The decompression unit 152 implements a decompression pipeline. The decompression pipeline of the decompression unit 152 involves processing using one or more decompression schemes. The decompression unit 152 can select between using one decompression scheme alone or using multiple decompression schemes in combination. For example, the decompression unit 152 may decompress data using zero value decompression and then further decompress the data using shared value decompression. In the example of zero value plus shared value decompression, the order in which the compression schemes are applied can vary depending on how the decompression unit 152 is implemented. Thus, zero value decompression could be performed first followed by shared value decompression. Alternatively, shared value decompression could be performed first. In general, the order in which zero value decompression and shared value decompression are performed does not matter as the resulting decompressed data would be the same irrespective of which decompression scheme is applied first.

In the example of FIG. 1, the decompression unit 152 may be configured to receive compressed data from the system memory 182 and decompress the compressed data, using one or more decompression schemes, to generate decompressed data for storage in the on-device memory buffers. Alternatively, in certain embodiments, the decompression unit 152 may be configured to receive compressed data from the on-device memory buffers and decompress the compressed data for use by a processing component of the NNA 100 (e.g., one of the NPUs 124, 126, and 128, or the control sequencer 112). Thus, the data may be stored in either compressed or decompress form within the on-device memory buffers 140. Irrespective of how the data is stored in the on-device memory buffers 140, the data may be sent from the system memory to the NNA 100 in compressed form. Sending the data to the NNA in compressed form reduces the amount of time required to send the data.

The on-device memory buffers 140 are used to abstract the physical implementation of memories that form the activation, weight, and output buffers from NNA components (e.g., the compute engine 116 and the DME 150) that access data in these buffers. The data in the activation, weight, and output buffers is accessed through addressing the buffers individually, with the buffer addresses being mapped to the physical addresses of the memories where the data is stored. In certain embodiments, the memories of the on-device memory buffers 140 are implemented as static random-access memory (SRAM) devices. However, the on-device memory buffers 140 can be implemented using other types of memory, both volatile and non-volatile (e.g., flash memory, DRAM, resistive RAMs, and the like). As mentioned above, the data in be stored in the on-device memory buffers 140 in compressed or decompressed form.

The NPUs 124, 126, and 128 perform numerical arithmetic operations using the activations and weights stored in the on-device memory buffers 140 according to the assembly instructions provided by the code generator 180 and used to program the NPUs 124, 126, and 128. Each NPU is configured to perform all or part of a compute instruction. The compute instruction may, for example, implement at least some of the computation described earlier in connection with processing by a node of a neural network, i.e., computing a weighted sum of input activations multiplied by weights, adding a bias value to the weighted sum, and then applying an activation function. Other types of computations may also be performed by the NPUs 124, 126, and 128. For example, identifying the minimum and maximum values among a first set of data values represented by a first vector and a second set of data values represented by a second vector, performing an extended multiply add, subtracting two vectors, and other types of operations applicable to data from a vector or matrix may be performed. These arithmetic operations may be optimized by the code generator 180 for the particular layers of the specific machine learning model being initialized by selecting the appropriate arithmetic blocks 182 comprising assembly instructions and modifying these assembly instructions according to the particular input/output sizes used by the various layers of the model.

Figure 2:
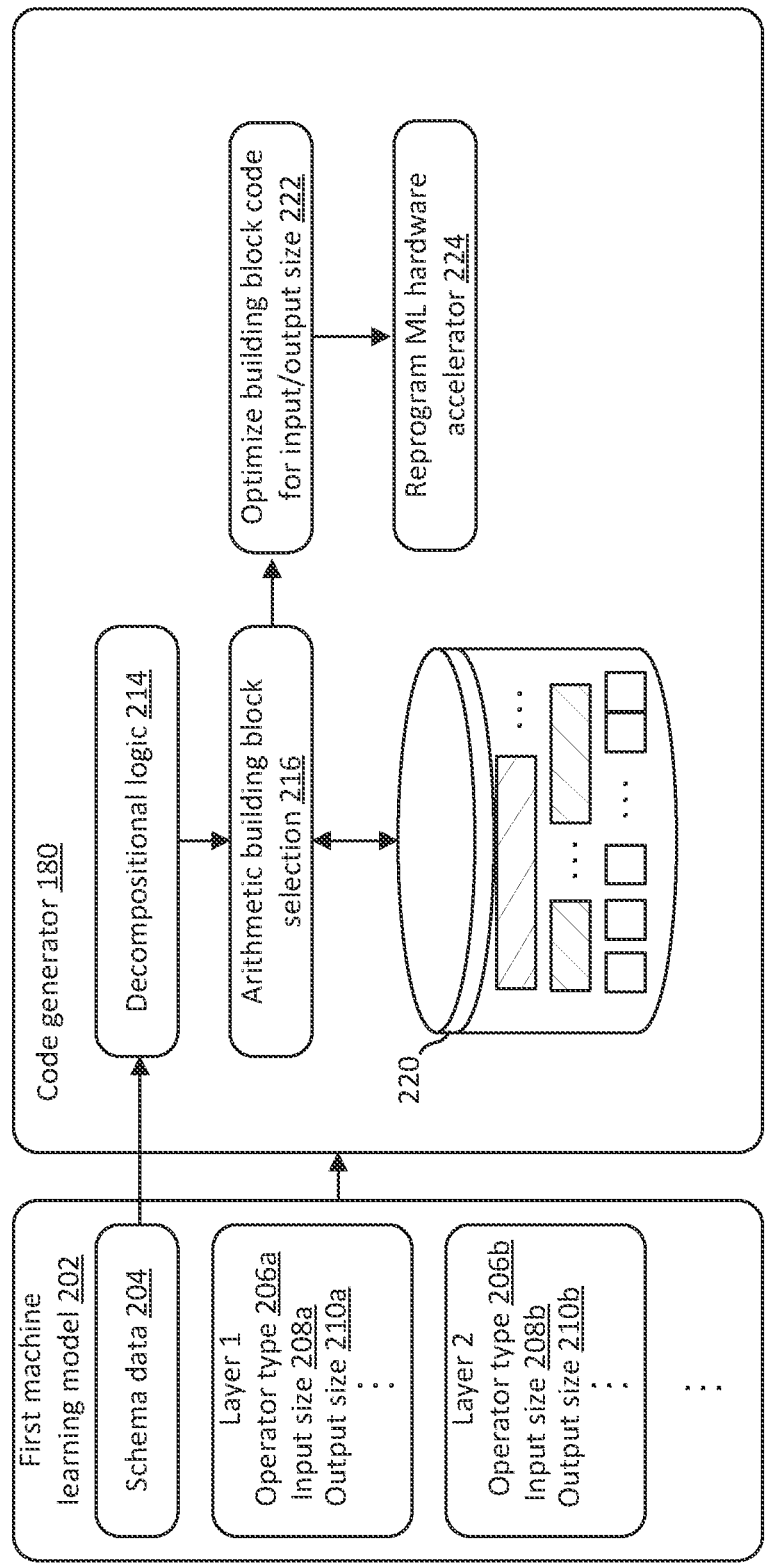
FIG. 2 depicts a code generator that may be used to dynamically optimize model operators for a given machine learning model, according to various embodiments of the present disclosure.

FIG. 2 depicts a code generator that may be used to dynamically optimize model operators for a given machine learning model, according to various embodiments of the present disclosure. A first machine learning model 202 may be loaded onto a device (e.g., a user device such as a home security camera, voice assistant-enabled device, mobile phone, etc., or any other desired computing device). The code generator 180 may include logic that may be used to parse the schema data 204 (e.g., metadata included with the first machine learning model 202 that may describe the organization of the machine learning model 202). For example, the schema data 204 may describe the various layers of the model (Layer 1, Layer 2, . . . , etc.), the operator types of each layer (e.g., vector addition, max pooling, etc.), and/or the output size of each layer.

The decompositional logic 214 of the code generator 180 may iterate through each layer of the first machine learning model 202 and may determine the attributes of that layer. For example, for Layer 1, the decompositional logic 214 may parse the metadata (e.g., graph data describing the organization and/or attributes of the model data) to determine the operator type 206a, the input size 208a, the output size 210*a*. Similarly, for layer 2, the decompositional logic 214 may parse the metadata to determine the operator type 206*b*, input size 208*b*, output size 210*b*, etc.

Code generator 180 may perform arithmetic building block selection 216 to select the previously-stored arithmetic building blocks in non-transitory computer-readable memory 220. The building blocks may include assembly code that has been previously generated for various different types of arithmetic operations. The assembly code may be very low level and granular (e.g., assembly operations that cannot be further subdivided) or may be at a higher logical level (e.g., a matrix multiplication requiring several multiplication and addition sub-operations to determine the final result). The code generator 180 may programmatically select the appropriate assembly code building blocks according to the decomposed model structure output by the decompositional logic 214. The selected building blocks may then be optimized for the appropriate input size at action 222 (or output size). Accordingly, after optimizing the building block code for the particular input sizes (at action 222) the resulting assembly code that is optimized for the specific machine learning model being initialized may be used to program the processors implementing the inference engine for the model (e.g., the NPUs described above in reference to FIG. 1). Once dynamically optimized operator instructions are generated at action 222, the machine learning hardware (or general purpose processor(s) and/or other programmable circuits) may be reprogrammed during model initialization (at action 224) using the optimized operator instructions.

An example of a machine learning model operation that can be optimized by the code generator 180 is a vector addition. A naive or unoptimized implementation (e.g., the default for an inference engine that can execute a large variety of models that can be loaded) would be a simple For-loop (or other loop operation, such as a while loop) over all vector elements with a per-element addition (e.g., using default operator instructions). Such unoptimized inference engine instructions are programmed for general-sized arithmetic operators and are not specialized to the particular machine learning model being initialized. There are different possible modifications by code generator 180 for the vector addition operation. If the input size of the vector is very large (e.g., above a predefined threshold dimensionality), the code generator 180 could generate code for programming the inference engine that results in the same for-loop implementation. However, if the input size of the vector is below the relevant threshold, the code generator 180 can "unroll" the loop and instead create an operator with just addition operations and an operation to shift between the different elements of the vector (e.g., add the first dimension of a first input vector to the first dimension of a second input vector, shift to the second dimension, add, and so on, until the last dimension for the input size is reached) eliminating the for-loop overhead (e.g., where the processor performs a check to determine if there are additional elements for each iteration). In other words, instead of executing an iterative loop, assembly code may be selected from the stored building blocks to implement a specific number of per-element addition operations for the specific dimensionality of the input. Additionally, on devices with native vectorization support, the code generator 180 may replace the addition calls with vector additions (e.g., using the appropriate assembly building blocks) which typically add four elements at a time. If the input is not a multiple of four, the code generator 180 returns the correct output length and uses proper vector padding to take full advantage of the native vectorization. This simple example illustrates a small set of decisions implemented by the code generator 180 which can be expanded to any desired arithmetic operators that on-device inference requires for the particular machine learning model being initialized (e.g., first machine learning model 202 in the example depicted in FIG. 2).

FIGS. 3A-3G depict examples of dynamic optimization of model operators at runtime for a given machine learning model, in accordance with various examples of the present disclosure. The examples depicted in FIGS. 3A-3G are merely an illustrative implementation of the functionality of the code generator 180 for dynamically optimizing model operators at runtime for a given machine learning model load. However, it should be noted that the particular operators optimized and the specific arithmetic building blocks provided to optimize such operators are dependent on the desired implementation and may vary.

The examples in FIGS. 3A-3G illustrate that a runtime dynamically optimized inference engine is not only feasible, but results in CPU improvements on the devices executing the code generator 180. The particular implementation example of FIGS. 3A-3G focus on loop unrolling to illustrate runtime dynamic optimization. However, the general concept can be extended to any optimization methodology (e.g., for any operator) that improves inference performance based on knowledge of the input data shape to the operator (e.g., from decomposition of the model using model metadata).

When writing an on-device inference engine, typically arithmetic operations are initially implemented as naïve or unoptimized versions of the operator to validate functionality. Once basic functionality is confirmed, these implementations may be replaced with arithmetic operations which are manually optimized for the target. However, optimizing arithmetic operations for a specific target in a static, hard-coded way is not scalable as models change and/or are replaced on device over time. Accordingly, the afore-mentioned manually optimized operators are generic enough to work with any input or output size required by any model which the inference engine might be called upon to execute on device. In general, this means that the operators are generic enough to handle a wide range of input sizes. This general nature is needed so that a single inference engine can generically support a large number of model architectures with varying layer definitions. Once a single model is loaded on device the input sizes are known for every inference operation that will occur using the model schema. Manually optimizing the operators for each unique input size would result in quicker code execution, but is not feasible or maintainable long term.

Accordingly, the on-device code generator 180 described herein may replace the manually-optimized general sized arithmetic operators with a series of size-specific operators for the model to be run. Instead of manually implementing the fully optimized operators, highly-optimized building blocks of the arithmetic operation are implemented which can be stored, retrieved, and stitched together to form the full operator. These blocks can be at varying levels of granularity depending on the complexity level of the code generator 180. Although the optimization process may incur an on-device penalty at initialization time (e.g., a single time when the model is first initialized) to create the operators, once created the engine will be tuned to the model and will operate with higher efficiency, as shown in the examples below.

An interesting property of this code generator is that the operator decomposition depth, complexity of the code generator 180 and therefore the level of tuning to the model are all tied together and configurable. For new operators (e.g., previously undefined operator types), the code generator 180 may be seeded with no decomposition logic and may return the naïve implementation. This allows for a low barrier to entry for new operators and therefore does not block other innovation around new operators or new machine learning model architectures. Since most operators can eventually decompose to the same low-level arithmetic building blocks (e.g., addition, multiplication, looping, etc.) the set of manually optimized building blocks could be shared across operators with the decomposition logic being the only operator-specific code.

FIG. 3A depicts an example (Example 1) wherein pre-compiled binary code is dynamically loaded into memory and executed at runtime. The simple externally-compiled function in the example is output=input+8. This example first dynamically allocates a block of executable memory. Next, the pre-compiled bytecode is loaded into that memory. Finally, the memory is cast to a function and executed.

FIG. 3B (Example 2) illustrates how code may be compiled at runtime and then the dynamically-created code may be executed. This builds on Example 1 by replacing the externally-compiled code with code that is compiled at runtime. The function created in this case is output=input0*input1. Example 2 first dynamically allocates a block of executable memory. Then x86 bytecode is compiled for a simple multiplication function and loaded into the executable memory. Finally, the memory is cast to a function and executed.

FIG. 3C shows how an operator can be both optimized and compiled at runtime for a given set of input parameters. This is a generic form of an example where operators are customized on device to match what the input machine model would require during inference. This allows for replacement of generic forms of operators with machine learning model instance-specific implementations, eliminating remainder handling or loop overhead. Example 3 compares the performance of a general form dot product operator with a length-customized dot product operator (e.g., optimized by an on-device code generator such as code generator 180).

This example first reads in the input length to test from the user, showing the true dynamic nature of the optimizations. Then a block of dynamically executable memory is allocated. Next a loop-unrolled version of the dot product operator (for the particular input length read from the user input) is dynamically compiled and loaded into the executable memory. Finally, the memory is cast to a function and executed. The function execution is compared to a general form of the operator (using a for-loop and user-input length). As shown, the results are the same showing that the dynamically optimized arithmetic operator is accurate. However, as shown in the table in FIG. 3C the number of CPU cycles used to compute the result decreases significantly as the size of the array (e.g., the input dimensionality) increases. As shown, the dynamically-optimized dot product operator ("Custom Cycles" in the table in FIG. 3C) with the un-rolled for-loop uses 14.68% fewer CPU cycles relative to the generic dot product operator (using the for-loop) for an input array size of 16 and uses 23.21% fewer CPU cycles for an input array size of 24.

Example 4 depicted in FIG. 3D builds on Example 3 and shows one possible method for dynamically calculating memory requirements. In this example, the functions that create the compiled binary return the number of bytes used for the instructions. The example shown in Example 4 is a relatively simple example that does not require any additional code layers. Alternatively, a more complex "Compile" layer could be introduced to resolve memory requirements, register assignments, and other additional features.

Example 4 reads in the input length to test from the user, showing the dynamic nature of the optimizations. The amount of memory required is then calculated and a block of dynamically executable memory is allocated. Next, a loop-unrolled version of the dot product operator is dynamically compiled and loaded into the executable memory. Finally, the memory is cast to a function and executed. The function execution is compared to a general form of the operator (using a for-loop and inputted length).

Example 5, depicted in FIG. 3E, illustrates unit tests for dot product, vector addition, and vector multiplication operators. Example 5 acts as a unit test for the general and custom forms of these operations. General forms of operations may take any length input and may use a loop to accomplish the requested arithmetic steps. The dynamically optimized forms of the operations (e.g., the custom forms) are runtime optimized and compiled for a specific input length. These forms of dynamically-optimized operators represent the core operations allowed by the machine learning model in Example 6 (FIGS. 3F and 3G).

In Example 6, depicted in FIGS. 3F and 3G a basic dynamic model load is introduced. FIG. 3F depicts the schema of the model (e.g., the "Model Schema Definition") which is metadata describing the machine learning model being initialized. The concepts in the earlier examples are used to implement a basic dynamic model load, initialization, and execution of the inference engine. The machine learning model in Example 6 is defined as a JSON file and includes a dynamic set of vectorAdd, vectorMult and dot-Product layers. The input data to the system is defined by the Model Schema Definition (e.g., the metadata describing the model depicted in FIG. 3F).

Example 6 requests a user input path to a model JSON file and requests input as to whether dynamic optimization should be enabled or not. The model file included in Example 6 is model.json although other properly formatted JSON files could instead be used. In Example 6 (FIG. 3G), setting dynamic optimization to 1 enables the code generator 180 to generate runtime dynamically optimized and compiled operators (e.g., executable code), while setting dynamic optimization to 0 uses general form operators compiled at traditional compile time.

First, the binary of code generator 180 loads the model from a JSON file into a cJSON object which enables programmatic parsing of the model schema data. Next is to parse the cJSON object and convert it to a linked Model-Layer representation. ModelLayer is an internal representation of a layer and associated state such as implementation function, layer weights, input size, etc. Then the model is validated to ensure that it aligns with the constraints of this inference engine. Then the ModelLayer objects are initialized, including dynamic operator optimization if enabled. Finally, the model is run.

Profiling results are shown in FIG. 3G for the model defined in the default model.json. Results of 10 runs per form are shown, averaging the CPU cycle counts. As shown, the dynamically optimized operators result in a 24.11% reduction in the number of CPU cycles used, while the accuracy of the output is maintained. Note that the number of initialization cycles (Init Cycles) is increased when dynamic operator optimization is enabled. However, it should be noted that this increase only occurs the first time that the model is initialized. As shown in FIG. 3G, the number of Run Cycles are greatly reduced when dynamic operator optimization is enabled.

The examples in FIGS. 3A-3G optimize and dynamically compile at an assembly instruction level. However, as previously noted, the code generator 180 does not need to be constrained to this level of granularity. Instead, optimization may occur at various different hierarchical levels. Instead of taking in assembly instructions for optimization, a more incremental approach may be employed. For example, a vectorMult is built from assembly instructions, while a matrixMult is built from vectorMults, etc.

Figure 4:
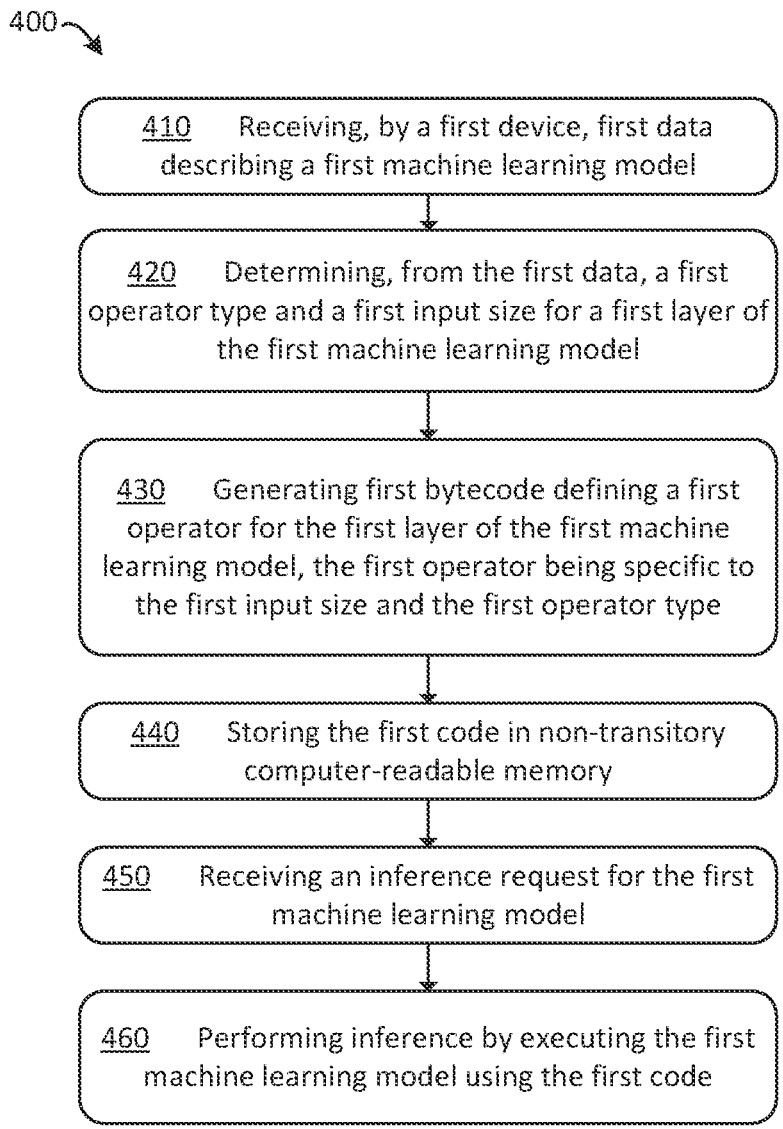
FIG. 4 depicts an example process for dynamic optimization of operators for a given machine learning model, in accordance with various aspects of the present disclosure.

FIG. 4 depicts an example process 400 for dynamic optimization of operators for a given machine learning model, in accordance with various aspects of the present disclosure. The actions of the process 400 may represent a series of instructions comprising computer readable machine code executable by a processing unit of an image signal processor, although various operations may be implemented in hardware. In various examples, the computer readable machine codes may be comprised of instructions selected from a native instruction set of the processor(s) and/or an operating system of the computing device.

Process 400 may begin at action 410, at which a first computing device may receive first data describing a first machine learning model. For example, a first machine learning model may be loaded on device. The first data describing the first machine learning model may include schema data including a model definition (e.g., similar to the Model Schema Definition depicted in FIG. 3F although the schema will, of course, vary depending on the particulars of the machine learning model being loaded/initialized).

Processing may continue at action 420, at which a first operator type and a first input size may be determined using the first data for a first layer of the first machine learning model. In various examples, a first output size may also be determined using the first data and/or a definition of the first operator type (e.g., an addition comprises an add operation for two 8-bit values). As previously described, the code generator 180 may iteratively parse the model definition (e.g., the model schema data) to determine the operator type for each layer of the model as well as the input size and output size for each layer.

Processing may continue at action 430, at which first bytecode may be generated defining a first operator for the first layer of the first machine learning model, the first operator being specific to the first input size and the first operator type. Bytecode refers to computer object code that is converted by an interpreter into binary machine code. The first bytecode is dynamically generated and compiled during initialization runtime. In various examples, the first code may be dynamically optimized runtime compiled operators that are specific to the particular operator type and the first input/output size. For example, the code generator 180 may generate a dynamically optimized operator that unrolls a dot product for-loop to instead perform per-element multiplication followed by summation for a vector input of the size defined by the model schema.

Processing may continue at action 440, at which the first code may be stored in non-transitory computer-readable memory. For example, after compiling the relevant code for the dynamically optimized operator, the code may be stored in memory so that the next time inference is to be run for the model, the code may be retrieved from memory without requiring the dynamic optimization steps used during the first initialization of the model.

Processing may continue at action 450, at which an inference request may be received from the first machine learning model. The inference request may be a request for the model to process some input data to generate an output (e.g., a prediction, the type of which will depend on the particular input data and the particular model). At action 460, inference may be performed by executing the first machine learning model using the first code that was previously dynamically optimized and stored in the non-transitory computer-readable memory at action 440.

Figure 5:
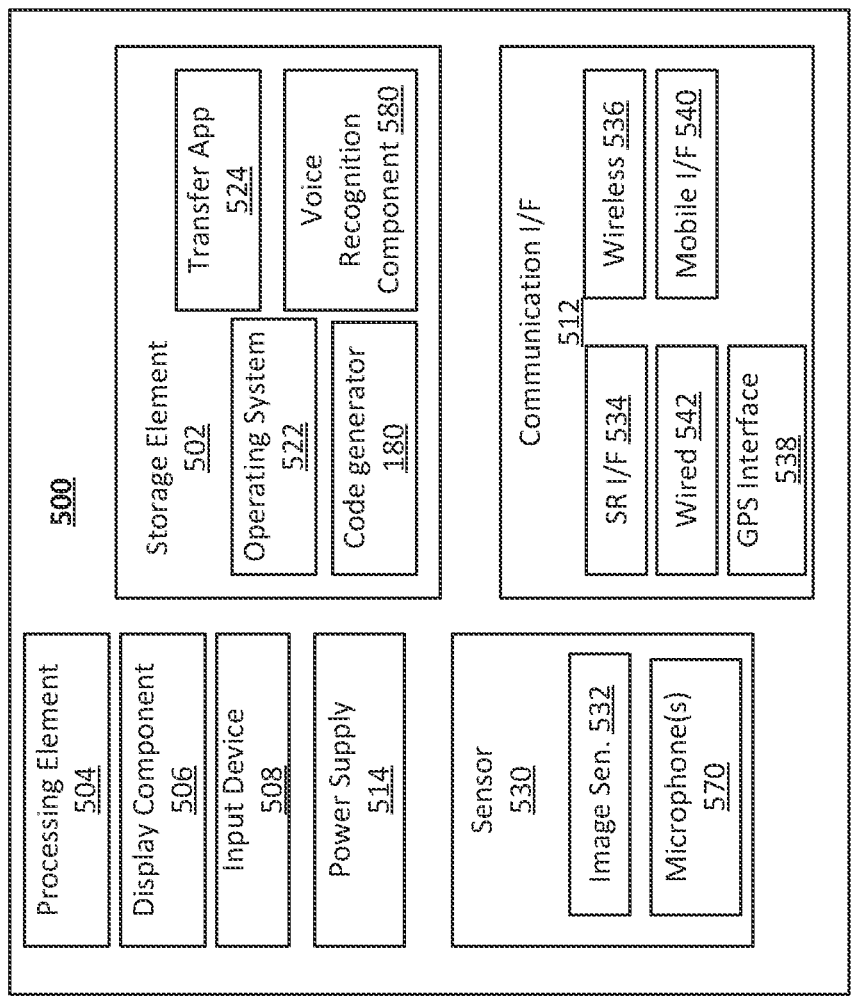
FIG. 5 is a block diagram showing an example architecture of a network-connected device that may be used in accordance with various aspects described herein.

FIG. 5 is a block diagram showing an example architecture 500 of a network-connected device that may be used to implement, at least in part, a speech processing-enabled device, the NNA architecture, and/or the dynamic operator optimization techniques described herein. It will be appreciated that not all devices will include all of the components of the architecture 500 and some user devices may include additional components not shown in the architecture 500. The architecture 500 may include one or more processing elements 504 for executing instructions and retrieving data stored in a storage element 502. The processing element 504 may comprise at least one processor. Any suitable processor or processors may be used. For example, the processing element 504 may comprise one or more digital signal processors (DSPs). In some examples, the processing element 504 may be effective to determine a wakeword and/or to stream audio data to a speech processing system. The storage element 502 can include one or more different types of memory, data storage, or computer-readable storage media devoted to different purposes within the architecture 500. For example, the storage element 502 may comprise flash memory, random-access memory, disk-based storage, etc. Different portions of the storage element 502, for example, may be used for program instructions for execution by the processing element 504, storage of images or other digital works, and/or a removable storage for transferring data to other devices, etc.

The storage element 502 may also store software for execution by the processing element 504. An operating system 522 may provide the user with an interface for operating the computing device and may facilitate communications and commands between applications executing on the architecture 500 and various hardware thereof. A transfer application 524 may be configured to receive images, audio, and/or video from another device (e.g., a mobile device, image capture device, and/or display device) or from an image sensor 532 and/or microphone 570 included in the architecture 500. In some examples, the transfer application 524 may also be configured to send the received voice requests to one or more voice recognition servers. The storage element 502 may also include an instantiation of the code generator 180 described herein. As previously described, the code generator 180 may be effective to parse model schemas to dynamically optimize operators for the specific model load during runtime.

When implemented in some user devices, the architecture 500 may also comprise a display component 506. The display component 506 may comprise one or more light-emitting diodes (LEDs) or other suitable display lamps. Also, in some examples, the display component 506 may comprise, for example, one or more devices such as cathode ray tubes (CRTs), liquid-crystal display (LCD) screens, gas plasma-based flat panel displays, LCD projectors, raster projectors, infrared projectors or other types of display devices, etc. As described herein, display component 506 may be effective to display content determined provided by a skill executed by the processing element 504 and/or by another computing device. In some examples, the display component 506 and/or one or more speakers (not shown)

may be effective to output an indication that unconsumed notifications (e.g., voice notifications) are pending. In some cases, there may be an indicator light effective to provide such an indication. In addition, speakers of the architecture 500 may output the voice notification audio upon receiving a user command to consume or "read" the voice notifications.

The architecture 500 may also include one or more input devices 508 operable to receive inputs from a user. The input devices 508 can include, for example, a push button, touch pad, touch screen, wheel, joystick, keyboard, mouse, trackball, keypad, light gun, game controller, or any other such device or element whereby a user can provide inputs to the architecture 500. These input devices 508 may be incorporated into the architecture 500 or operably coupled to the architecture 500 via wired or wireless interface. In some examples, architecture 500 may include a microphone 570 or an array of microphones for capturing sounds, such as voice requests. Voice recognition component 580 may interpret audio signals of sound captured by microphone 570. In some examples, voice recognition component 580 may listen for a "wakeword" to be received by microphone 570. Upon receipt of the wakeword, voice recognition component 580 may stream audio to a voice recognition server for analysis, such as a speech processing system. In various examples, voice recognition component 580 may stream audio to external computing devices via communication interface 512.

When the display component 506 includes a touch-sensitive display, the input devices 508 can include a touch sensor that operates in conjunction with the display component 506 to permit users to interact with the image displayed by the display component 506 using touch inputs (e.g., with a finger or stylus). The architecture 500 may also include a power supply 514, such as a wired alternating current (AC) converter, a rechargeable battery operable to be recharged through conventional plug-in approaches, or through other approaches such as capacitive or inductive charging.

The communication interface 512 may comprise one or more wired or wireless components operable to communicate with one or more other computing devices. For example, the communication interface 512 may comprise a wireless communication module 536 configured to communicate on a network, such as a computer communication network, according to any suitable wireless protocol, such as IEEE 802.11 or another suitable wireless local area network (WLAN) protocol. A short range interface 534 may be configured to communicate using one or more short range wireless protocols such as, for example, near field communications (NFC), Bluetooth, Bluetooth LE, etc. A mobile interface 540 may be configured to communicate utilizing a cellular or other mobile protocol. A Global Positioning System (GPS) interface 538 may be in communication with one or more earth-orbiting satellites or other suitable position-determining systems to identify a position of the architecture 500. A wired communication module 542 may be configured to communicate according to the USB protocol or any other suitable protocol.

The architecture 500 may also include one or more sensors 530 such as, for example, one or more position sensors, image sensors, and/or motion sensors. An image sensor 532 is shown in FIG. 5. An example of an image sensor 532 may be a camera configured to capture color information, image geometry information, and/or ambient light information.

Figure 6:
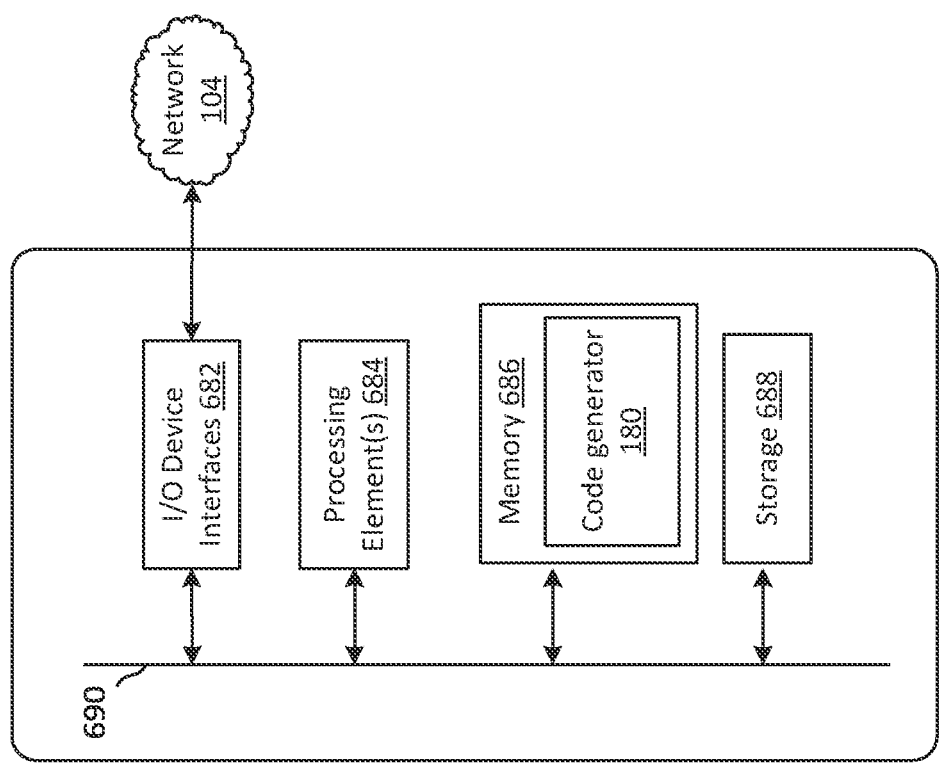
FIG. 6 is a block diagram showing an example architecture of computing devices that may be used in accordance with various aspects described herein.

FIG. 6 is a block diagram conceptually illustrating example components of a computing device, such as the natural language-processing computing device(s) 720 and/or another computing device(s) performing compression of machine learning models. In operation, each of these devices (or groups of devices) may include computer-readable and computer-executable instructions that reside on the respective device, as will be discussed further below.

Each computing device may include one or more controllers/processors 684, which may each include at least one central processing unit (CPU) for processing data and computer-readable instructions, and a memory 686 for storing data and instructions of the respective device. In at least some examples, memory 686 may store, for example, instructions effective to perform the various compression techniques described herein. Additionally, in various examples, compressed NLU models compressed using the various techniques described herein may be stored in memory 686. In various further examples, memory 686 may be effective to store instructions effective to program controllers/processors 684 to perform the various techniques described above in reference to FIGS. 1-5. Accordingly, in FIG. 6, code generator 180 may be implemented to optimize machine learning model operators prior to pushing the models to a different device. Code generator 180 is depicted as being stored within memory 686. For example, the code generator 180 may optimize model operators and the resulting dynamically optimized machine learning models (including the compiled optimized operator code) may be sent to edge computing devices where the models may be executed and/or which comprise an NNA. The memories 686 may individually include volatile random access memory (RAM), non-volatile read only memory (ROM), non-volatile magnetoresistive memory (MRAM), and/or other types of memory. Each device may also include a data storage component 688 for storing data and controller/processor-executable instructions. Each data storage component 688 may individually include one or more non-volatile storage types such as magnetic storage, optical storage, solid-state storage, etc. Each device may also be connected to removable or external non-volatile memory and/or storage (such as a removable memory card, memory key drive, networked storage, etc.) through respective input/output device interfaces 682. The architecture depicted in FIG. 6 may communicate with one or more other devices over network 104 (e.g., the Internet).

Computer instructions for operating each device and its various components may be executed by the respective device's controllers/processors 684, using the memory 686 as temporary "working" storage at runtime. A device's computer instructions may be stored in a non-transitory manner in non-volatile memory 686 (e.g., a non-transitory computer-readable memory), storage 688, or an external device(s). Alternatively, some or all of the executable instructions may be embedded in hardware or firmware on the respective device in addition to or instead of software.

Each device may include input/output device interfaces 682. A variety of components may be connected through the input/output device interfaces 682, as will be discussed further below. Additionally, each device may include an address/data bus 690 for conveying data among components of the respective device. Each component within a device may also be directly connected to other components in addition to (or instead of) being connected to other components across the bus 690.

As noted above, multiple devices may be employed in a single system. In such a multi-device system, each of the devices may include different components for performing different aspects of the system's processing. The multiple devices may include overlapping components. The components of a natural language-processing computing device(s) 720, as described herein, are exemplary, and may be located as a stand-alone device or may be included, in whole or in part, as a component of a larger device or system.

Figure 7:
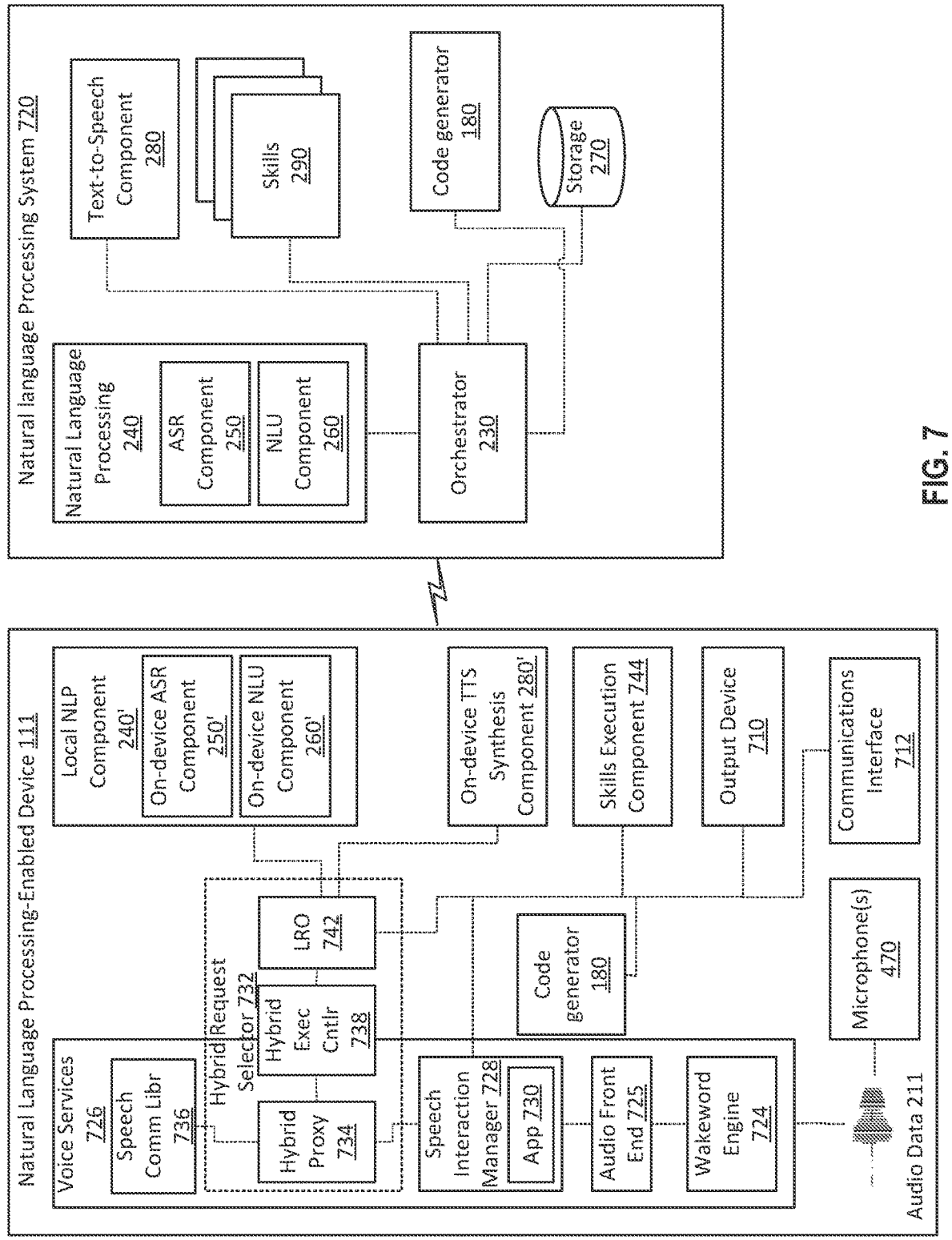
FIG. 7 is a block diagram illustrating a natural language processing-enabled device and a natural language processing management system, in accordance with embodiments of the present disclosure.

A system according to the present disclosure may operate using various components as described in FIG. 7. The various components illustrated FIG. 7 may be located on the same or different physical devices. Communication between various components illustrated in FIG. 7 may occur directly or across a network. In various examples, machine learning models optimized by the dynamically optimized operators generated by code generator 180 described herein and/or the NNA may be used in the context of natural language processing (NLP), as many NLP typically employs a multitude of machine learning models that may benefit from the optimization techniques, as described herein, to reduce latency and/or increase performance. For example, in the context of ASR, each frame of audio data for a given input of audio data (e.g., a single spoken request) may result in the invocation of an ASR model causing the ASR model weights to be loaded from system memory and processed using the model operators at a rate of 30 frames-per-second (or some other rate, depending on the example and/or the framerate) in a single audio input. Accordingly, the various optimization techniques described herein may significantly reduce latency and processor cycles resulting from the ASR task (and, indeed may improve performance). More generally, it may be advantageous to implement the code generator 180 on an edge computing device (e.g., a device at the edge of a network—whether or not it is a natural language processing enabled device) as such devices may be resource constrained and may benefit from the latency-reducing optimization techniques described herein. These techniques may enable such devices to execute more complex machine learning models for time sensitive results.

FIG. 7 includes a device 111 (e.g., a natural language processing enabled device) and a natural language processing system 720, in accordance with embodiments of the present disclosure. In various examples, device 111 may be a natural language processing-enabled device and may include microphones (e.g., far-field microphone arrays) used to transform audio into electrical signals. The device 111 may be among the network-connected devices described herein that are local to (e.g., communicating on the same LAN) the network-connected devices. Natural language processing may then be performed, either locally by the natural language processing components of device 111, by one or more other computing devices communicating with the device 111 over a network (e.g., natural language processing system 720), or by some combination of the device 111 and the one or more other computing devices. In various examples, device 111 may include and/or may be configured in communication with output device(s) 710 (e.g., speakers, displays, and/or other network connected devices among network-connected devices) effective to output information obtained in response to a user's spoken request or command, or to output content that may be of interest to one or more users. As used herein, a display of the device 111 refers to a display effective to output graphics such as images and/or video. Further, as used herein, a displayless device refers to a device that does not include a display that is effective to render graphical images or text.

In various examples, the device 111 may include and/or may be configured in communication with code generator 180. Accordingly, the device 111 may dynamically optimize and/or program local hardware for any machine learning models pushed to the device 111 according to the particular input size, output size, and operator types used by the specific model.

A natural language processing-enabled computing system may respond to user utterances by outputting content and/or performing one or more other actions, such as playing music, providing information, calling a taxi, displaying an image, etc. Generally, input data received by the various natural language processing systems and components described herein may comprise natural language input data. Natural language input data may be in the form of audio data representing spoken user utterances (e.g., a spoken user request), text data (e.g., a request typed by a user), gesture data (e.g., data representing a user shaking their head while wearing ear buds, making a hand gesture, etc.), and/or some combination of text data, gesture data, and/or audio data.

Speech-processing systems may be configured with multiple applications (e.g., thousands, tens of thousands, or more applications) that can be used to potentially respond to a user request. Applications may be referred to herein as "skills." Natural language processing systems may be effective to process spoken and/or textual natural language inputs to determine data representing a semantic understanding of the inputs. Skills may include any application effective to communicate with a natural language processing system in order to take one or more actions based on inputs from the natural language processing system. For example, a speech-processing system may include music skills, video skills, calendar skills, timer skills, general knowledge answering skills, game skills, device control skills, etc. As described herein, skills receive NLU data comprising slot data and/or intent data and are configured to determine one or more actions based on the slot data and/or intent data. Examples of such actions may include text to be processed into output audio data (e.g., synthetic speech) via a text-to-speech (TTS) component, an executable command effective to play a song from a music service, a movie from a movie service, or the like, an executable command effective to cause a system to perform an action (e.g., turning lights on/off, controlling an appliance, purchasing an item, etc.).

The invocation of a skill by a user's utterance may include a request that an action be taken. The number of applications/skills continues to grow and the rate of growth is increasing as developers become more accustomed to application programming interfaces (APIs) and application development kits provided for the voice user interface system. Rule-based approaches and/or predefined utterance matching may be used in some systems for processing requests spoken in a certain format to invoke a particular application. In at least some examples, a "skill," "skill component," "skill," "natural language processing skill," and the like may be software running on a computing device, similar to a traditional software application running on a computing device. Such skills may include a voice user interface in addition to or instead of, in at least some instances, a graphical user interface, smart home device interface, and/or other type of interface.

In addition to using the microphone(s) 570 to capture utterances and convert them into digital audio data 211, the device 111 may additionally, or alternatively, receive audio data 211 (e.g., via the communications interface 712) from another device in the environment. In various examples, the device 111 may capture video and/or other image data using a camera. Under normal conditions, the device 111 may operate in conjunction with and/or under the control of a remote, network-based or network-accessible natural language processing system 720. The natural language processing system 720 may, in some instances, be part of a network-accessible computing platform that is maintained and accessible via a wide area network (WAN). Network-accessible computing platforms such as this may be referred to using terms such as "on-demand computing", "software as a service (SaaS)", "platform computing", "network-accessible platform", "cloud services", "data centers", and so forth. The natural language processing system 720 may be configured to provide particular functionality to large numbers of local (e.g., in-home, in-car, etc.) devices of different users. The WAN is representative of any type of public or private, wide area network, such as the Internet, which extends beyond the environment of the device 111. Thus, the WAN may represent and/or include, without limitation, data and/or voice networks, a wired infrastructure (e.g., coaxial cable, fiber optic cable, etc.), a wireless infrastructure (e.g., radio frequencies (RF), cellular, satellite, etc.), and/or other connection technologies.

In some embodiments, the natural language processing system 720 may be configured to receive audio data 211 from the device 111, to recognize speech in the received audio data 211, and to perform functions in response to the recognized speech. In some embodiments, these functions involve sending a command, from the natural language processing system 720, to the device 111 to cause the device 111 to perform an action, such as output an audible response to the user speech via output device 710 (e.g., one or more loudspeakers). Thus, under normal conditions, when the device 111 is able to communicate with the natural language processing system 720 over a WAN (e.g., the Internet), some or all of the functions capable of being performed by the natural language processing system 720 may be performed by sending a command over a WAN to the device 111, which, in turn, may process the command for performing actions. For example, the natural language processing system 720, via a remote command that is included in remote response data, may instruct the device 111 to output an audible response (e.g., using a on-device text-to-speech (TTS) synthesis component 280) to a user's question, to output content (e.g., music) via output device 710 (e.g., one or more loudspeakers) of the device 111, or to control other devices in the local environment (e.g., the user's home). It is to be appreciated that the natural language processing system 720 may be configured to provide other functions, in addition to those discussed herein, such as, without limitation, providing step-by-step directions for navigating from an origin to a destination location, conducting an electronic commerce transaction on behalf of a user as part of a shopping function, establishing a communication session between the current user and another user, etc.

In order to process voice commands locally, the device 111 may include a local voice services component 726. When a user utterance including the wakeword is captured by the microphone 570 of the device 111, the audio data 211 representing the utterance is received by a wakeword engine 724 of the voice services component 726. The wakeword engine 724 may be configured to compare the audio data 211 to stored models used to detect a wakeword (e.g., "Computer") that indicates to the device 111 that the audio data 211 is to be processed for determining an intent. Thus, the wakeword engine 724 is configured to determine whether a wakeword is detected in the audio data 211, and, if a wakeword is detected, the wakeword engine 724 can proceed with routing the audio data 211 to an audio front end (AFE) 725 (sometimes referred to as an acoustic front end (AFE)) of the voice services component 726. If a wakeword is not detected in the audio data 211, the wakeword engine 724 can refrain from sending the audio data 211 to the AFE 725, thereby preventing the audio data 211 from being further processed. The audio data 211 can be discarded.

The AFE 725 is configured to transform the audio data 211 received from the wakeword engine 724 into data for processing by a suitable ASR component and/or NLU component. The AFE 725 may reduce noise in the audio data 211 and divide the digitized audio data 211 into frames representing a time intervals for which the AFE 725 determines a number of values, called features, representing the qualities of the audio data 211, along with a set of those values, called a feature vector, representing the features/qualities of the audio data 211 within the frame. Many different features may be determined, and each feature represents some quality of the audio data 211 that may be useful for ASR processing and/or NLU processing. A number of approaches may be used by the AFE 725 to process the audio data 211, such as mel-frequency cepstral coefficients (MFCCs), perceptual linear predictive (PLP) techniques, neural network feature vector techniques, linear discriminant analysis, semi-tied covariance matrices, or other approaches known to those of skill in the art. In some embodiments, the AFE 725 is configured to use beamforming data to process the received audio data 211. Beamforming can be used to distinguish between the directions from which speech and noise originate. Accordingly, the microphones 570 may be arranged in a beamforming array to receive multiple audio signals, where multiple audio sources including speech may be identified in different beams and processed. Beamforming may involve processing multiple audio signals (e.g., originating from multiple microphones in a microphone array) together, such as by time shifting one audio signal with respect to another audio signal, to increase the signal and decrease the noise in the audio. Time offsets in the audio data 211, used by the AFE 725 in beamforming, may be determined based on results of the wakeword engine 724's processing of the audio data 211. For example, the wakeword engine 724 may detect the wakeword in the audio data 211 from a first microphone 570 at time, t, while detecting the wakeword in the audio data 211 from a second microphone 570 a millisecond later in time (e.g., time, t+1 millisecond), and so on and so forth, for any suitable number of audio signals corresponding to multiple microphones 470 in a microphone array. In various examples, operation of the wakeword engine 724 (and/or machine learning models thereof) may be optimized using the code generator 180 as described herein.

A speech interaction manager (SIM) 728 of the voice services component 726 may receive the audio data 211 that has been processed by the AFE 725. The SIM 728 may manage received audio data 211 by processing request data and non-speech noise or sounds as events, and the SIM 728 may also manage the processing of commands that are used to respond to the user speech or non-speech noise or sounds (e.g., by controlling the action(s) of natural language processing components of device 111). The SIM 728 may include one or more client applications 730 for performing various functions at the device 111.

A hybrid request selector component 732 of the device 111 is shown as including a hybrid proxy component (HP) 734, among other components. The HP 734 can be implemented as a layer within the voice services component 726 that is located between the SIM 728 and a speech communication library (SCL) 736, and may be configured to proxy traffic to/from the natural language processing system 720.

For example, the HP 734 may be configured to pass messages between the SIM 728 and the SCL 736 (such as by passing events and instructions there between), and to send messages to/from a hybrid execution controller component (HEC) 738 of the hybrid request selector component 732. For instance, command data received from the natural language processing system 720 can be sent to the HEC 738 using the HP 734, which sits in the path between the SCL 736 and the SIM 728. The HP 734 may also be configured to allow audio data 211 received from the SIM 728 to pass through to the natural language processing system 720 (via the SCL 736) while also receiving (e.g., intercepting) this audio data 211 and sending the received audio data 211 to the HEC 738 (sometimes via an additional SCL).

As will be described in more detail below, the HP 734 and the HEC 738 are configured to perform a handshake procedure to connect to each other. As part of this handshake procedure, the HP 734 and the HEC 738 exchange data including, without limitation, configurations, context, settings, device identifiers (ID), networking protocol versions, time zones, and language data (sometimes referred to herein as "locale data"). Based on at least some of this data (e.g., based at least in part on the language data) exchanged during the handshake procedure, the HEC 738 determines whether to accept or reject the connection request from the HP 734. If the HEC 738 rejects the HP's 734 connection request, the HEC 738 can provide metadata to the HP 734 that provides a reason why the connection request was rejected.

A on-device natural language processing component 240' (sometimes referred to as a "natural language processing component," a "spoken language understanding (SLU) component," a "speech engine," or an "engine") is configured to process audio data 211 (e.g., audio data 211 representing user speech, audio data 211 representing non-speech noise or sounds, etc.). In some embodiments, the hybrid request selector component 732 may further include a local request orchestrator component (LRO) 742. The LRO 742 is configured to notify the on-device natural language processing component 240' about the availability of new audio data 211 that represents user speech, and to otherwise initiate the operations of the on-device natural language processing component 240' when new audio data 211 becomes available. In general, the hybrid request selector component 732 may control the execution of the on-device natural language processing component 240', such as by sending "execute" and "terminate" events/instructions to the on-device natural language processing component 240'. An "execute" event may instruct the on-device natural language processing component 240' to continue any suspended execution based on audio data 211 (e.g., by instructing the on-device natural language processing component 240' to execute on a previously-determined intent in order to generate a command). Meanwhile, a "terminate" event may instruct the on-device natural language processing component 240' to terminate further execution based on the audio data 211, such as when the device 111 receives command data from the natural language processing system 720 and chooses to use that remotely-generated command data.

The LRO 742 may interact with a skills execution component 744 that is configured to receive intent data output from the on-device natural language processing component 240' and to execute a skill based on the intent.

To illustrate how the device 111 can operate at runtime, consider an example where a user utters an expression, such as "Computer, turn off the kitchen lights." The audio data 211 is received by the wakeword engine 724, which detects the wakeword "Computer," and forwards the audio data 211 to the SIM 728 via the AFE 725 as a result of detecting the wakeword. The SIM 728 may send the audio data 211 to the HP 734, and the HP 734 may allow the audio data 211 to pass through to the natural language processing system 720 (e.g., via the SCL 736), and the HP 734 may also input the audio data 211 to the on-device natural language processing component 240' by routing the audio data 211 through the HEC 738 of the hybrid request selector 732, whereby the LRO 742 notifies the on-device natural language processing component 240' of the incoming audio data 211. At this point, the hybrid request selector 732 may wait for response data from the natural language processing system 720 and/or the on-device natural language processing component 240'.

The on-device natural language processing component 240' is configured to receive the audio data 211 from the hybrid request selector 732 as input, to recognize speech (and/or non-speech audio events) in the audio data 211, to determine an intent (e.g., user intent) from the recognized speech (or non-speech audio event). This intent can be provided to the skills execution component 744 via the LRO 742, and the skills execution component 744 can determine how to act on the intent by generating directive data. In some cases, a directive may include a description of the intent (e.g., an intent to turn off {device A}). In some cases, a directive may include (e.g., encode) an identifier of a second device, such as the kitchen lights, and an operation to be performed at the second device. Directive data that is generated by the skills execution component 744 (and/or the natural language processing system 720) may be formatted using Java, such as JavaScript syntax, or JavaScript-based syntax. This may include formatting the directive using JSON. In some embodiments, a locally-generated directive may be serialized, much like how remotely-generated directives are serialized for transmission in data packets over the network. In other embodiments, a locally-generated directive is formatted as a programmatic API call with a same logical operation as a remotely-generated directive. In other words, a locally-generated directive may mimic remotely-generated directives by using a same, or a similar, format as the remotely-generated directive.

The on-device natural language processing component 240' may include an automatic speech recognition (ASR) component 250' that is configured to perform ASR processing on the audio data 211 to convert the audio data 211 into text data (sometimes referred to herein as "ASR text data," an "ASR result", or "ASR data"). ASR transcribes audio data 211 into text data representing the words of the user speech contained in the audio data 211. A spoken utterance in the audio data 211 can be input to the on-device ASR component 250', which then interprets the utterance based on the similarity between the utterance and pre-established language models available to the on-device natural language processing component 240'. In some embodiments, the on-device ASR component 250' outputs the most likely text recognized in the audio data 211, or multiple hypotheses in the form of a lattice or an N-best list with individual hypotheses corresponding to confidence scores or other scores (such as probability scores, etc.). In some embodiments, the on-device ASR component 250' is customized to the user (or multiple users) who created a user account to which the device 111 is registered. For instance, the language models (and other data) used by the on-device ASR component 250' may be based on known information (e.g., preferences) of the user, and/or on a history of previous interactions with the user.

The on-device natural language processing component 240' may also include a on-device NLU component 260' that performs NLU processing on the generated ASR text data to determine intent data and/or slot data (referred to herein as a "NLU result", or "NLU data") so that directives may be determined (e.g., by the skills execution component 744) based on the intent data and/or the slot data. Generally, the on-device NLU component 260' takes textual input (such as text data generated by the on-device ASR component 250') and attempts to make a semantic interpretation of the ASR text data.

Natural Language Processing System

In other situations, the device 111 may send the audio data 211 to the natural language processing system 720 for processing. As described above, the device 111 may capture audio using the microphone 570, and send audio data 211 (e.g., representing a spoken user request), corresponding to the captured audio, to the natural language processing system 720. The device 111 may include a wakeword detection component that detects when input audio includes a spoken wakeword, and when the wakeword is detected, the audio data 211 is sent by the device 111 to the natural language processing system 720. In various examples, the natural language processing system may be effective to detect other triggering audio events besides a wakeword. For example, a natural language processing system may be used in association with a security system. When the security system is armed the natural language processing system may listen for glass breaking noises, footsteps, talking, etc., in order to generate an alert and/or to trigger one or more other actions. In some other examples, functionality one or more devices may be controlled based on audio detected by one or more devices. For example, audio may be used to determine user presence which may affect device controls (e.g., allowing music playback to transition between different devices based on user presence). In general, the various techniques described herein may be used to determine a device that most clearly detects audio (e.g., the closest device to an audio source). However, in some cases, the closest device may not be selected by the techniques described herein (e.g., where a microphone of the closest device is covered (e.g., a towel laid on top of a device may muffle the input signal detected by the device's microphone) and does not receive a clear input audio signal).

Upon receipt by the natural language processing system 720, the audio data 211 may be sent to an orchestrator component 230. The orchestrator component 230 may include memory and logic that enables the orchestrator component 230 to send various pieces and forms of data to various components of the system.

Similar to the operation described above with respect to the on-device natural language processing component 240' of the device 111, the orchestrator component 230 may send the audio data 211 to a natural language processing component 240. An ASR component 250 of the natural language processing component 240 transcribes the audio data 211 into one or more hypotheses representing speech contained in the audio data 211. The natural language processing component 240 interprets the speech in the audio data based on a similarity between the characteristics of the audio data corresponding to the speech and pre-established language models. For example, the natural language processing component 240 may compare the audio data 211 with models for sounds (e.g., subword units such as phonemes) and sequences of sounds to identify words that match the sequence of sounds in the speech represented in the audio data 211. The natural language processing component 240 may send text data generated thereby to an NLU component 260 of the natural language processing component 240. The text data output by the natural language processing component 240 may include a top scoring hypothesis of the speech represented in the audio data 211 or may include an N-best list including a group of hypotheses of the speech represented in the audio data 211, and potentially respective scores ASR processing confidence scores.

The NLU component 260 attempts to make a semantic interpretation of the phrases or statements represented in the text data input therein. That is, the NLU component 260 determines one or more meanings associated with the phrases or statements represented in the text data based on individual words represented in the text data. The NLU component 260 interprets a text string to derive an intent of the user (e.g., an action that the user desires be performed) as well as pertinent pieces of information in the text data that allow a device (e.g., the natural language processing system 720) to complete the intent. For example, if the text data corresponds to "Play the new album by [Musical_Artist]", the NLU component 260 may determine the user intended to invoke a music playback intent to play the identified album.

The natural language processing system 720 may include a non-transitory computer-readable memory storage 270, storing various instructions for operation of the natural language processing system 720. As previously described, in some examples, the voice-to-text NLG 225 may be instantiated as a part of the natural language processing system 720 and/or as a separate component configured in communication with the natural language processing system 720.

As described above, the natural language processing system 720 may include one or more skill components 290. The natural language processing system 720 may also include a TTS component 280 that synthesizes speech (e.g., generates audio data) corresponding to text data input therein. The TTS component 280 may perform speech synthesis using one or more different methods. In one method of synthesis called unit selection, the TTS component 280 matches text data against one or more databases of recorded speech. Matching units are selected and concatenated together to form audio data. In another method of synthesis called parametric synthesis, the TTS component 280 varies parameters such as frequency, volume, and noise to create an artificial speech waveform output. Parametric synthesis uses a computerized voice generator, sometimes called a vocoder.

The various components of the natural language processing system 720 and the device 111 described herein may be implemented in software, hardware, firmware, or some combination thereof.

The natural language processing system 720 may reside on device 111, in a cloud computing environment, or some combination thereof. For example, the device 111 may include computing equipment, some portion of which is configured with some or all of the components or functionality of natural language processing system 720 and another portion of which is configured with some or all of the components or functionality of computing device(s) used in natural language processing system 720. The device 111 may then perform a variety of functions on its own (such as when remote communications are unavailable), and/or may communicate (when capable) with computing device(s) and/ or the natural language processing system 720 to perform other functions. Alternatively, all of the functionality may reside on the device 111 or remotely.

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon applying one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or other type of application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A method comprising:
receiving, by a first computing device, first data defining a first machine learning model;
determining, using the first data, a first input size for a first layer of the first machine learning model, the first input size defining a first number of dimensions of a first input vector and a second input vector;
determining, using the first data, a first operator type for the first layer of the first machine learning model, the first operator type corresponding to vector addition using a loop operation that is agnostic to input size;
determining first assembly code stored in non-transitory computer-readable memory, wherein the first assembly code is associated with the first operator type;
generating, during initialization of the first machine learning model, second assembly code by modifying the first assembly code to replace the vector addition using the loop operation that is agnostic to the input size with vector addition for a finite number of elements corresponding to the first number of dimensions of the first input vector and the second input vector; and
storing the second assembly code in the non-transitory computer-readable memory.

2. The method of claim 1, further comprising:
receiving a first inference request to execute the first machine learning model, the first inference request comprising first input data;
loading the second assembly code into memory; and
processing the first input data using the second assembly code to generate output data of a first output size.

3. The method of claim 1, further comprising:
determining, for the first operator type, at least a first operation and a second operation associated with the first operator type, wherein the first operation comprises an addition and the second operation comprises a shift between vector dimensions;
determining first assembly instructions stored in the non-transitory computer-readable memory for performing the first operation; and
determining second assembly instructions stored in the non-transitory computer-readable memory for performing the second operation, wherein the second assembly code comprises a combination of the first assembly instructions and the second assembly instructions.

4. The method of claim 1, further comprising:
determining, using the first data, a second operator type for a second layer of the first machine learning model;
determining that the second operator type is an undefined operator type; and
generating computer-executable code for implementing the second operator type during runtime using default operator instructions of a neural network accelerator of the first computing device.

5. A method comprising:
receiving, by a first computing device, first data describing a first machine learning model;
determining, from the first data, a first operator type for a first layer of the first machine learning model;
determining a first input size for the first layer;

generating first executable code defining a first operator for the first layer of the first machine learning model, wherein the first operator is associated with the first input size and the first operator type;

storing the first executable code in non-transitory computer-readable memory;

sending second data to the first machine learning model; and generating, by the first machine learning model using the second data, first output data, wherein the first executable code is executed during processing of the second data by the first machine learning model.

6. The method of claim 5, further comprising determining, prior to the generating the first executable code, first assembly code stored in the non-transitory computer-readable memory that corresponds to the first operator, wherein the first executable code comprises the first assembly code.

7. The method of claim 5, further comprising:
determining, for the first operator type, first assembly code stored in the non-transitory computer-readable memory; and
generating second assembly code by modifying the first assembly code such that the second assembly code is specific to the first input size, wherein the first executable code comprises the second assembly code.

8. The method of claim 5, further comprising:
determining, for the first operator type, at least a first operation and a second operation associated with the first operator type;
determining first assembly instructions stored in the non-transitory computer-readable memory for performing the first operation; and
determining second assembly instructions stored in the non-transitory computer-readable memory for performing the second operation, wherein the first executable code comprises a combination of the first assembly instructions and the second assembly instructions.

9. The method of claim 5, further comprising:
determining, from the first data, schema data representing an organization of the first machine learning model; and
determining the first operator type and the first input size at least in part by parsing the first data using the schema data.

10. The method of claim 5, further comprising programming machine learning accelerator hardware of the first computing device using the first executable code from a first configuration that is agnostic to any machine learning model input size, output size, or operator type to a second configuration that is associated with the first machine learning model.

11. The method of claim 5, further comprising:
determining that hardware of the first computing device is programmed to perform the first operator using a loop operation that is agnostic to input size; and
programming the hardware to perform a number of operations that is associated with the first input size using the first executable code.

12. The method of claim 5, wherein a first processor of the first computing device is programmed for general-sized arithmetic operators, the method further comprising generating, using the first executable code, a re-programmed first processor programmed for at least one arithmetic operator that is specific to the first input size.

13. A system, comprising:
at least one processor; and
at least one non-transitory computer-readable memory storing instructions that, when executed by the at least one processor, are effective to:
receive first data describing a first machine learning model;
determine, from the first data, a first operator type for a first layer of the first machine learning model;
determine a first input size for the first layer;
generate first executable code defining a first operator for the first layer of the first machine learning model, wherein the first operator is associated with the first input size and the first operator type;
store the first executable code in the at least one non-transitory computer-readable memory;
send second data to the first machine learning model; and
generate, by the first machine learning model using the second data, first output data, wherein the first executable code is executed during processing of the second data by the first machine learning model.

14. The system of claim 13, the at least one non-transitory computer-readable memory storing further instructions that, when executed by the at least one processor, are further effective to determine, prior to the generation of the first executable code, first assembly code stored in the at least one non-transitory computer-readable memory that corresponds to the first operator, wherein the first executable code comprises the first assembly code.

15. The system of claim 13, the at least one non-transitory computer-readable memory storing further instructions that, when executed by the at least one processor, are further effective to:
determine, for the first operator type, first assembly code stored in the at least one non-transitory computer-readable memory; and
generate second assembly code by modifying the first assembly code such that the second assembly code is specific to the first input size, wherein the first executable code comprises the second assembly code.

16. The system of claim 13, the at least one non-transitory computer-readable memory storing further instructions that, when executed by the at least one processor, are further effective to:
determine, for the first operator type, at least a first operation and a second operation associated with the first operator type;
determine first assembly instructions stored in the at least one non-transitory computer-readable memory for performing the first operation; and
determine second assembly instructions stored in the at least one non-transitory computer-readable memory for performing the second operation, wherein the first executable code comprises a combination of the first assembly instructions and the second assembly instructions.

17. The system of claim 13, the at least one non-transitory computer-readable memory storing further instructions that, when executed by the at least one processor, are further effective to:
determine, from the first data, schema data representing an organization of the first machine learning model; and
determine the first operator type and the first input size at least in part by parsing the first data using the schema data.

18. The system of claim 13, further comprising:
machine learning accelerator hardware, wherein the at least one non-transitory computer-readable memory storing further instructions that, when executed by the at least one processor, are further effective to:
program the machine learning accelerator hardware using the first executable code from a first configuration that is agnostic to any machine learning model input size, output size, or operator type to a second configuration that is associated with the first machine learning model.

19. The system of claim 13, the at least one non-transitory computer-readable memory storing further instructions that, when executed by the at least one processor, are further effective to:
determine that hardware of the system is programmed to perform the first operator using a loop operation that is agnostic to input size; and
programming the hardware to perform a number of operations that is associated with the first input size using the first executable code.

20. The system of claim 13, wherein a first processor of the at least one processor is programmed for general-sized arithmetic operators and wherein the at least one non-transitory computer-readable memory stores further instructions that, when executed by the at least one processor, are further effective to generate, using the first executable code, a re-programmed first processor programmed for at least one arithmetic operator that is specific to the first input size.

* * * * *